United States Patent
Malhotra et al.

(10) Patent No.: US 12,195,133 B2
(45) Date of Patent: Jan. 14, 2025

(54) THROTTLE CONTROL AND SAFETY SWITCH DEVICE

(71) Applicant: UNO Minda Limited, Haryana (IN)

(72) Inventors: Tarun Malhotra, Haryana (IN); Shwetaank Sharma, Haryana (IN); Jitendra Kumar Saini, Haryana (IN)

(73) Assignee: UNO Minda Limited, Haryana (IN)

( * ) Notice: Subject to any disclaimer, the term of this patent is extended or adjusted under 35 U.S.C. 154(b) by 0 days.

(21) Appl. No.: 18/240,527

(22) Filed: Aug. 31, 2023

(65) Prior Publication Data

US 2024/0076008 A1    Mar. 7, 2024

(30) Foreign Application Priority Data

Sep. 1, 2022  (IN) .............................. 202211050092

(51) Int. Cl.
| | |
|---|---|
| *F02D 41/00* | (2006.01) |
| *B62J 45/00* | (2020.01) |
| *B62J 50/22* | (2020.01) |
| *B62K 23/06* | (2006.01) |

(52) U.S. Cl.
CPC ............... *B62K 23/06* (2013.01); *B62J 45/00* (2020.02); *B62J 50/22* (2020.02)

(58) Field of Classification Search
CPC .......... F02D 11/107; F02D 2009/0296; F02D 2009/0254; F02D 2009/0277
USPC ...................................................... 123/339.15
See application file for complete search history.

(56) References Cited

U.S. PATENT DOCUMENTS

| | | | |
|---|---|---|---|
| 7,591,126 B2* | 9/2009 | Cox ..................... | A01D 34/824 56/10.8 |
| 2018/0215261 A1* | 8/2018 | Seegert ................... | F16C 1/105 |
| 2019/0040810 A1* | 2/2019 | Andersson .............. | F02D 41/04 |

* cited by examiner

*Primary Examiner* — Long T Tran
*Assistant Examiner* — James J Kim
(74) *Attorney, Agent, or Firm* — Rothwell, Figg, Ernst and Manbeck, P.C.

(57) ABSTRACT

A throttle control and safety switch device that serves the dual function of adjusting a throttle of an ATV (all-terrain vehicle) while turning off the engine in the event of failure of a throttle cable or if the throttle cable is stuck, is disclosed. The throttle control and safety switch device includes an operating lever connected to a pivot shaft for pivotal movement about an axis (A-A'). A first carrier connected to the pivot shaft includes a safety switch and a cable attachment portion to engage a throttle actuating cable. The safety switch transmits a cutoff signal to an electronic control unit (ECU) upon actuation by a plunger portion of a second carrier pivotally connected to the pivot shaft via fastener and connected to the first carrier via a dowel and slot arrangement.

11 Claims, 6 Drawing Sheets

THROTTLE CONTROL AND SAFETY SWITCH DEVICE

FIELD OF THE INVENTION

The present disclosure relates to throttle control devices for vehicles. More particularly, the present disclosure relates to a throttle control and safety switch device that serves the dual function of adjusting a throttle of a vehicle while turning off the engine in the event of failure of a throttle cable or in case the throttle cable is stuck. The throttle control and safety switch device eliminate failures which can be caused in conventional mechanisms.

BACKGROUND

Issues related to throttle cable in all-terrain vehicles (ATV) is a widespread problem which occurs due to freezing temperatures & dust effect on the cable. As this vehicle is made to run in off-road & peak environmental conditions. So, to avoid any possibility of accident, a fail-safe mechanism is required which auto turns off the engine in case of failure of the throttle cable or in case the throttle cable remains stuck. Conventional ATV throttles have a tarnishing problem due to moisture exposure, sparking in contacts & complex gear design.

Conventional throttle switches employed in ATVs have complex designs, consisting of gear mechanism to transfer force from the throttle lever to the throttle cable. Although this conventional design is being used in running vehicles, they have several limitations. For example, conventional mechanism does not have the sealed compartment due to which, moisture enters the compartment and affects the contact terminal of the switch, resulting in tarnishing, corrosion of the terminal and hence leading to improper contact. Secondly, using the plastic gear mechanism promotes wear and tear and affects the angular movement of the throttle lever, leading to early failures. Having sluggish movement of the contact terminal, these are prone to sparking between contacts during contact making & breaking, leading to carbon deposition in contact hence no continuity.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

The present invention discloses a throttle control and safety switch device including an operating lever, a first carrier, and a second carrier. The operating lever is connected to a pivot shaft for pivotal movement about an axis (A-A'). The first carrier is connected to the pivot shaft and pivotal about the axis (A-A') in accordance with pivotal motion of the operating lever. The first carrier includes a safety switch and a cable attachment portion. The safety switch is configured to generate and transmit a cutoff signal to an electronic control unit (ECU) upon actuation by a plunger portion. The cable attachment portion is adapted to engage a throttle actuating cable. The second carrier is pivotally connected to the pivot shaft by a fastener such that the second carrier is pivotal relative to the first carrier about the axis (A-A'). Moreover, the second carrier is connected to the first carrier by a dowel and slot arrangement. The second carrier comprises the plunger portion configured at a lower end of the second carrier.

When the throttle actuating cable is in tension, the throttle actuating cable will keep pulling the first carrier away from the plunger portion of the second carrier. Therefore, in this configuration, the safety switch will never be in pressed condition or actuated thereby leading to an open circuit. In a non-operational state of the throttle actuating cable, the first carrier is adapted to move towards the second carrier and the plunger portion of the second carrier presses the safety switch. This means, in the event of the throttle actuating cable breaking or being stuck, tension is released from the throttle actuating cable causing a compression spring to push the second carrier along with the plunger portion towards the safety switch simultaneously activating the safety switch thereby closing the circuit and actuating the safety switch. Therefore, the safety switch generates and transmits a cutoff signal to an electronic control unit (ECU) for switching off the engine.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

Figure 1:
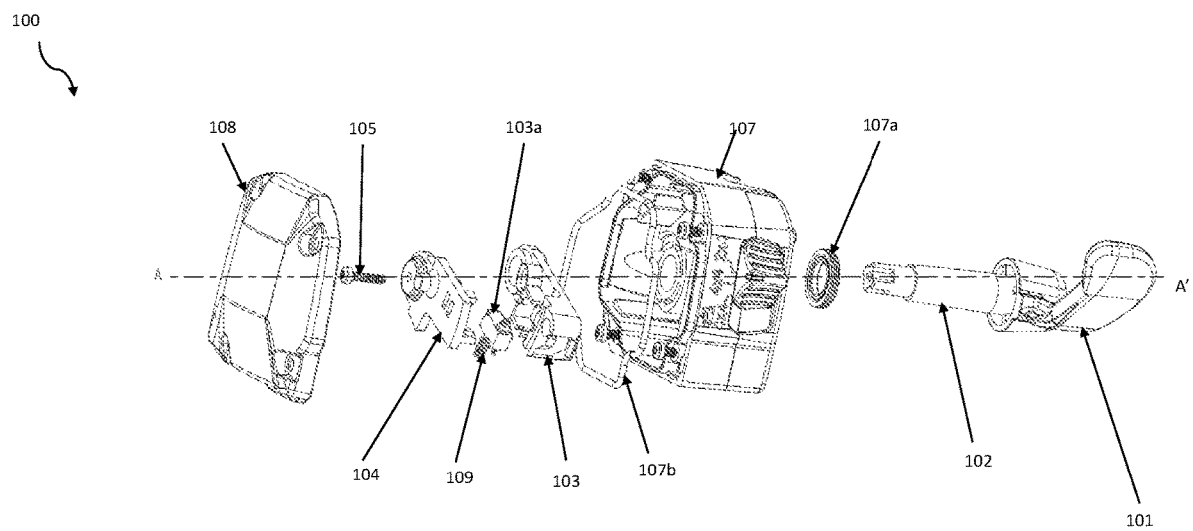
FIG. 1 exemplarily illustrates an exploded view of a throttle control and safety switch device.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION OF FIGS

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

FIG. 1 exemplarily illustrates an exploded view of a throttle control and safety switch device 100. The throttle control and safety switch device 100 includes an operating lever 101 connected to a pivot shaft 102 for pivotal movement about an axis (A-A'). A first carrier 103 is connected to the pivot shaft 102 and pivotable about the axis A-A' in accordance with pivotal motion of the operating lever 101. As exemplarily illustrated in FIG. 1, the operating lever 101 and the pivot shaft 102 form a generally L-shaped member when viewed along the axis (A-A'). In an embodiment, the operating lever 101 is formed in a flat shape so that it can be pushed easily with a finger. In an embodiment, the first carrier 103 is disposed on an interior surface of a case 107. The case 107 comprises a hollow cavity configured to receive the pivot shaft 102 of the operating lever 101. A lower seal 107a is positioned around the pivot shaft 102 to securely seal the clearance between an outer diameter of the pivot shaft 102 and an inner diameter of the hollow cavity of the case 107. Similarly, an upper seal 107b is sandwiched between the case 107 and a bottom cover 108 of the throttle control and safety switch device 100 to restrict entry of water & dust particulates. Also, since the circuit is fully sealed and there is no chance of water or dust entry, the possibility of corrosion/tarnishing on contacts is eliminated. A compression spring 109 is provided in a space between the first carrier 103 and a second carrier 104.

Figure 3A:
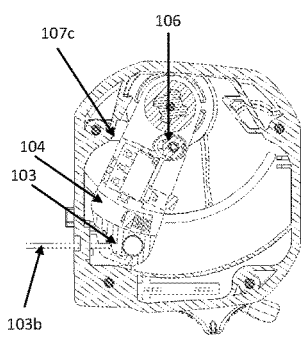
FIG. 3A exemplarily illustrates a zero-throttle position of the throttle control and safety switch device with a bottom cover of the throttle control and safety switch device removed.
Figure 3B:
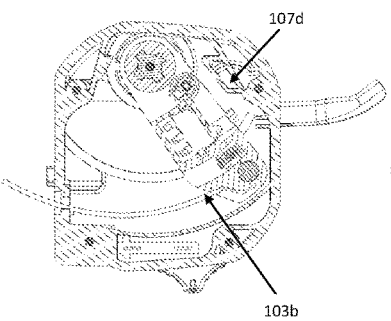
FIG. 3B exemplarily illustrates a full throttle position of the throttle control and safety switch device with the bottom cover of the throttle control and safety switch device removed.
Figure 3C:
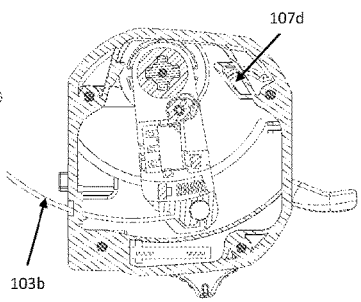
FIG. 3C exemplarily illustrates a throttle cable stuck position of the throttle control and safety switch device with the bottom cover of the throttle control and safety switch device removed.
Figures 4A, 4B:
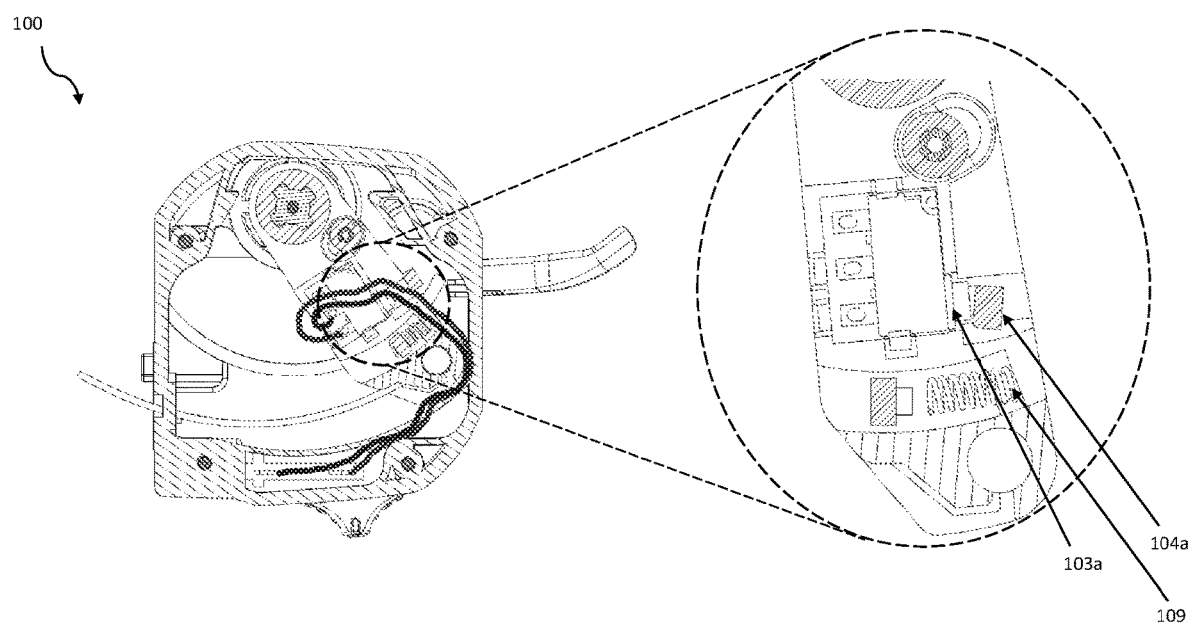
FIG. 4A exemplarily illustrates a perspective view of the throttle control and safety switch device with the bottom cover of the throttle control and safety switch device removed.
FIG. 4B exemplarily illustrates an enlarged view of a portion the first carrier and the second carrier of the throttle control and safety switch device with the bottom cover of the throttle control and safety switch device removed.

The first carrier 103 includes a safety switch 103a configured to generate and transmit a cutoff signal to an electronic control unit ECU upon actuation by a plunger portion 104a (shown in FIG. 4B). In an embodiment, the plunger portion 104a is configured at a lower end of the second carrier 104. Further, the first carrier 103 includes a cable attachment portion adapted to engage a throttle actuating cable 103b (shown in FIGS. 3A-3C). A second carrier 104 is pivotally connected to the pivot shaft 102 by a fastener 105. Additionally, the second carrier 104 is connected to the first carrier 103 by a dowel and slot arrangement 106 (shown in FIGS. 3A-3C). The second carrier 104 is pivotable relative to the first carrier 103 about the axis A-A'.

Figure 2A:
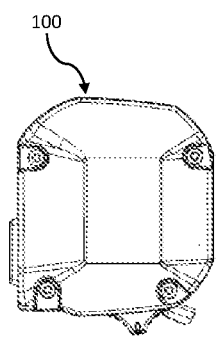
FIG. 2A exemplarily illustrates an assembled top view of the throttle control and safety switch device.
Figure 2B:
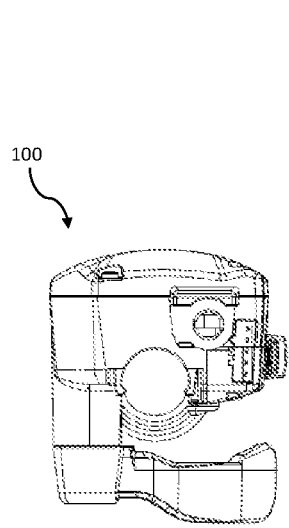
FIG. 2B exemplarily illustrates an assembled left-side view of the throttle control and safety switch device.
Figure 2C:
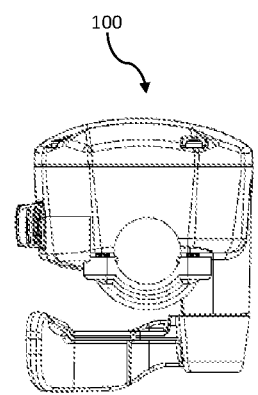
FIG. 2C exemplarily illustrates an assembled right-side view of the throttle control and safety switch device.
Figure 2D:
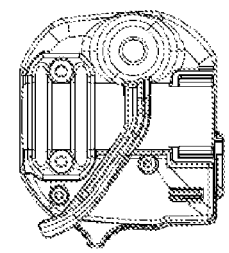
FIG. 2D exemplarily illustrates an assembled bottom view of the throttle control and safety switch device.

FIG. 2A exemplarily illustrates an assembled top view of the throttle control and safety switch device 100. FIG. 2B exemplarily illustrates an assembled left-side view of the throttle control and safety switch device 100. FIG. 2C exemplarily illustrates an assembled right-side view of the throttle control and safety switch device 100. FIG. 2D exemplarily illustrates an assembled bottom view of the throttle control and safety switch device 100.

FIG. 3A exemplarily illustrates a zero-throttle position of the throttle control and safety switch device 100 with the bottom cover 108 of the throttle control and safety switch device 100 removed. FIG. 3B exemplarily illustrates a full throttle position of the throttle control and safety switch device 100 with the bottom cover 108 of the throttle control and safety switch device 100 removed. FIG. 3C exemplarily illustrates a throttle cable stuck position of the throttle control and safety switch device 100 with the bottom cover 108 of the throttle control and safety switch device 100 removed. The operating lever 101 is operably coupled with the first carrier 103 such that the first carrier 103 travels between a first dead stopper 107c and a second dead stopper 107d of the case 107 when the operating lever 101 moves from a zero-throttle position to a full throttle position.

This means, in the zero-throttle position, the operating lever 101 is operably coupled with the first carrier 103 such that the first carrier 103 engages with the first dead stopper 107c of the case 107 enclosing the first carrier 103. Alternatively, when the operating lever 101 is in the full throttle position, the operating lever 101 is operably coupled with the first carrier 103 such that the first carrier 103 engages with the second dead stopper 107d of the case 107. The second carrier 104 is pivotally connected to the pivot shaft 102 by a fastener 105. Additionally, the second carrier 104 is connected to the first carrier 103 by a dowel and slot arrangement 106 having a 10° angular movement relative to each other. The safety switch 103a is fixed on the first carrier 103 and the plunger portion 104a is configured on the second carrier 104 for actuating the safety switch 103a.

When the operating lever 101 is pressed, the first carrier 103 rotates around the axis (A-A') resulting in rotation of the second carrier 104. This is because the second carrier 104 is connected to the first carrier 103 by a dowel and slot arrangement 106. The first carrier 103 is pulled towards the second carrier 104 to an extent due to force applied by the throttle actuating cable 103b that is under tension. As the second carrier 104 rotates further, force is applied against the compression spring 109. The dowel and slot arrangement 106 causes the first carrier 103 to rotate in the same direction against the force of the throttle actuating cable 103b. Since the throttle actuating cable 103b is mounted on the first carrier 103, the first carrier 103 pulls the throttle actuating cable 103b and opens the throttle further.

Figure 4C:
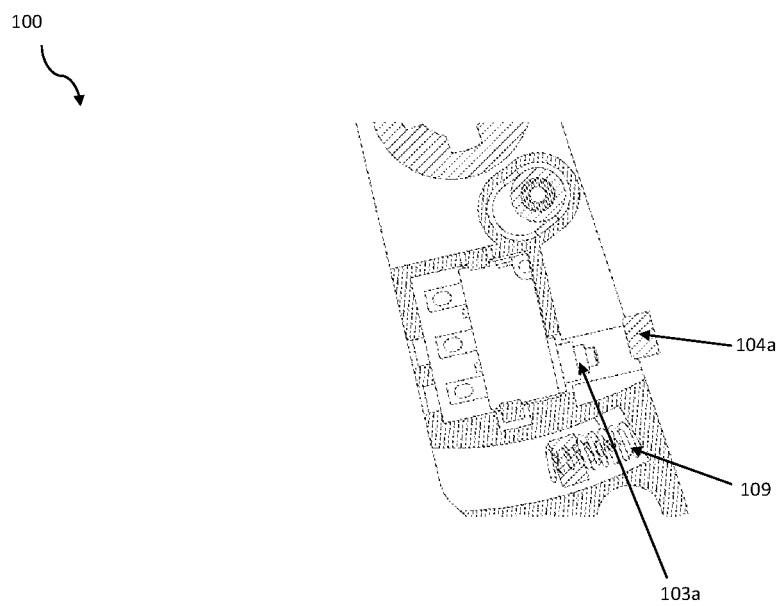
FIG. 4C exemplarily illustrates an enlarged view of a portion the first carrier and the second carrier of the throttle control and safety switch device with the bottom cover of the throttle control and safety switch device removed.

FIG. 4A exemplarily illustrates a perspective view of the throttle control and safety switch device 100 with the bottom cover 108 of the throttle control and safety switch device 100 removed. FIGS. 4B-4C exemplarily illustrates an enlarged view of a portion of the first carrier 103 and the second carrier 104 of the throttle control and safety switch device 100 with the bottom cover 108 of the throttle control and safety switch device 100 removed. If the throttle actuating cable 103b is stuck or damaged, the force from throttle actuating cable 103b becomes zero. This means the first carrier 103 is pushed towards the second carrier 104 due to the biasing force of the compression spring 109 between them. Therefore, in this case the plunger portion 104a of the second carrier 104 actuates the safety switch 103a and a cutoff signal is sent to an electronic control unit (ECU) to turn off the engine. The connection between the plunger portion 104a and the safety switch 103a is snap type, so contact making & breaking time is very less, which eliminates the possibility of sparking.

The throttle control and safety switch device 100 has several advantages over conventional devices. In the throttle control and safety switch device 100, no abusive load can be applied on the safety switch 103a or contacts, since motion between the first carrier 103 and the second carrier 104 is controlled by the deployment of the compression spring 109 and the provision of the dowel and slot arrangement 106, which is a feature absent in conventional switches. In the conventional design, due to the presence of the compression spring, mechanical contacts can fluctuate, which possibility has been eliminated in our design with snap contact. Furthermore, the possibility of corrosion of the contacts are eliminated, as the contact mechanism is kept in IP67 sealed mechanism, particularly the safety switch 103a. The provision of the upper seal 107b and the lower seal 107a reduces the possibility of sticking of mechanical parts at freezing temperature as entry of moisture is eliminated. Finally, existing systems use plastic gears which are prone to wear and tear and affects the angular movement of the throttle lever, leading to early failures whereas the throttle control and safety switch device 100 is a simpler and reliable mechanism as compared to the conventional design.

In an embodiment, the case 107 enclosing the first carrier 103 and the second carrier 104 defines an opening for receiving at least a portion of the pivot shaft 102. The case 107 includes the lower seal 107a for sealing a clearance between an outer diameter of the pivot shaft 102 and an inner diameter of the opening of the case 107. Moreover, the case 107 includes an upper seal 107b for sealing an interface between the case 107 and the bottom cover 108.

Figure 5A:
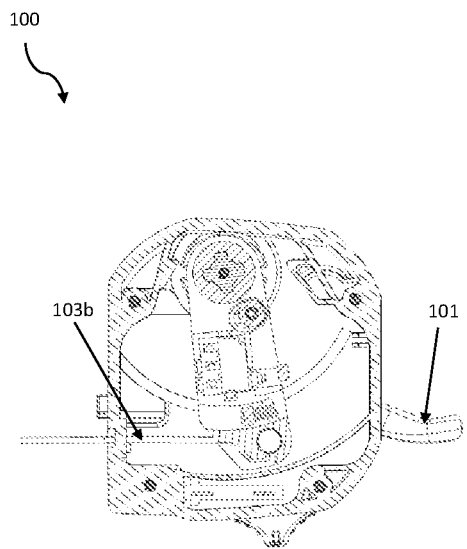
FIG. 5A exemplarily illustrates the throttle control and safety switch device with the bottom cover of the throttle control and safety switch device removed when a throttle actuating cable has sufficient torsion.

FIG. 5A exemplarily illustrates the throttle control and safety switch device 100 with the bottom cover 108 of the throttle control and safety switch device 100 removed when the throttle actuating cable 103b is in an operational state. As used herein, the phrase "throttle actuating cable 103b being in the operational state" may be construed to mean that the throttle actuating cable 103b is adapted to exert a tension force or has enough tension to pull the first carrier 103 away from the second carrier 104. When the throttle actuating cable 103b is in tension, the throttle actuating cable 103b keeps pulling the first carrier 103 away from the plunger portion 104a of the second carrier 104. Therefore, in this configuration, the safety switch 103a will never be in pressed condition or actuated thereby leading to an open circuit.

Figure 5B:
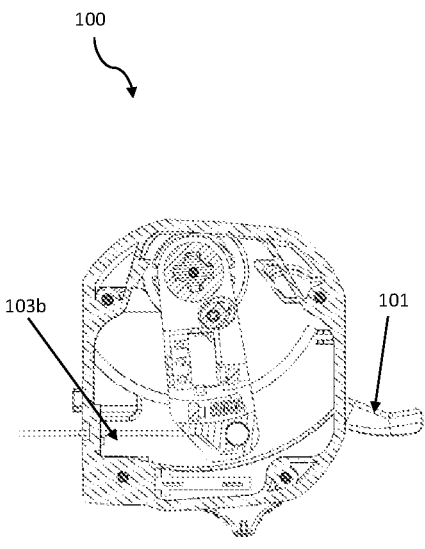
FIG. 5B exemplarily illustrates the throttle control and safety switch device with the bottom cover of the throttle control and safety switch device removed when the throttle actuating cable is stuck or has no torsion.

FIG. 5B exemplarily illustrates the throttle control and safety switch device 100 with the bottom cover 108 of the throttle control and safety switch device 100 removed when the throttle actuating cable 103b is in the non-operational state or is stuck or has no tension. As used herein, the phrase, "throttle actuating cable 103b being in the non-operational state" may be construed to mean that the throttle actuating cable 103b does not have enough tension to pull the first carrier 103 away from the second carrier 104. On the contrary, in the non-operational state of the throttle actuating cable 103b, the first carrier 103 is adapted to move towards the second carrier 104 and the plunger portion 104a of the second carrier 104 presses the safety switch 103a. As such, in the non-operational state of the throttle actuating cable 103b, a biasing force exerted by an elastic member moves the first carrier 103 towards the second carrier 104. In an embodiment, the elastic member is the compression spring 109. In the event of the throttle actuating cable 103 breaking or being stuck, tension is released from the throttle actuating cable 103 causing a compression spring 109 to push the second carrier 104 along with the plunger portion 104a towards the safety switch 103a simultaneously activating the safety switch 103a thereby closing the circuit and actuating the safety switch 103a. Therefore, the safety switch 103a generates and transmits a cutoff signal to an electronic control unit (ECU) for switching off the engine.

The electronic control unit (ECU) is further configured to generate a notification upon transmitting the cutoff signal. As used herein, the term "ECU" may refer to one or a combination of microprocessors, suitable logic, circuits, audio interfaces, visual interfaces, haptic interfaces, or the like. The ECU may include, but are not limited to a microcontroller, a Reduced Instruction Set Computing (RISC) processor, an Application-Specific Integrated Circuit (ASIC) processor, a Complex Instruction Set Computing (CISC) processor, a central processing unit (CPU), a graphics processing unit (GPU), a state machine, and/or other processing units or circuits.

The ECU may also comprise suitable logic, circuits, interfaces, and/or code that may be configured to execute a set of instructions stored in a memory unit. The memory unit may additionally store diverse types of information related to the vehicle or preferences of the passengers, for example, a set of predefined limiting parameters for the one or more components, driver behavior, location information, vehicle registration information, historical data related to passenger preferences and driver behavior, etc. In an exemplary implementation of the memory unit according to the present disclosure, the memory unit may include, but are not limited to, Electrically Erasable Programmable Read-only Memory (EEPROM), Random Access Memory (RAM), Read Only Memory (ROM), Hard Disk Drive (HDD), Flash memory, Solid-State Drive (SSD), and/or CPU cache memory.

The ECU may also be coupled to a notification unit of the vehicle to generate a notification indicating the non-operational state of the throttle actuating cable 103b. In an embodiment, the notification may be at least one of an audio notification, a visual notification, an audio-visual notification, and a haptic notification. In an embodiment according to the present disclosure, the notification unit may comprise one or a combination of suitable display, audio, and haptic interfaces, and/or code that may be configured to execute a set of instructions stored in the memory unit. Moreover, the ECU may also be operatively coupled to one or more sensors. In an embodiment, the sensors communicate with the ECU via an in-vehicle network. The in-vehicle network may include, but is not limited to, for example, a controller area network (CAN), a Bluetooth Low Energy (BLE) network, a vehicle area network (VAN), Domestic Digital Bus (D2B), Time-Triggered Protocol (TTP), Flex Ray, IEEE 1394, Carrier Sense Multiple Access With Collision Detection (CSMA/CD) based data communication protocol, Inter-integrated Circuit (I2C), Inter Equipment Bus (IEBus), Society of Automotive Engineers, (SAE) J1708, SAE J1939, International Organization for Standardization (ISO) 11992, ISO 11783, Power-line communication (PLC), Plastic Optic Fiber (PDF), Serial Peripheral Interface (SPI) bus, Local Interconnect Network (LIN), etc.

In an embodiment, the audio notification may include a loud warning siren or alarm which may be generated for a continuous or periodic interval of time. This means the audio notification is audible enough for personnel or people in the immediate vicinity. In some exemplary implementations of the present disclosure, the ECU generates a visual notification in addition to the audio notification via a display of the vehicle. The display may comprise suitable logic, circuitry, interfaces, and/or code that may be configured to render diverse types of information and/or entertainment content via a user interface. In an embodiment, the display may be a flashing visual indicator, such as a light emitting diode (LED), a headlamp, halogen lamps, indicator lights, or the like. The user interface may be a customized graphic user interface (GUI) configured to display vehicle information. The display may include but is not limited to a display of the driver vehicle interface (DVI), a display of an in-vehicle infotainment head unit, a projection-based display, an electro-chromic display, and/or holographic display. In other embodiments, the display may be a touchscreen display, a tactile electronic display, and/or a touchable hologram. As such, the display may be configured to receive inputs from the passenger or driver. In an embodiment, the driver/authorized personnel/operator may be required to clear the audio or visual notification. Alternately, the audio notification, the visual notification, or the audio-visual notification is configured to stop only based on an input received from the operator via the display. Consequently, the ECU configures the display to return to a normal indication mode.

In another embodiment according to the present disclosure, the audio notification is configured to be cleared based on an input received via a computing device. In an embodiment, the computing device may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device may also be implemented as a personal computer including both laptop computer and non-laptop computer configurations. The computing device can also be any type of network computing device.

In another embodiment, the notification unit may transmit radio notification with facilities outside of the vehicle such as a fire station, a police station, a vehicle management center, and an insurance firm. The notification unit may be configured of, for example, a telematic transceiver (DCM), a mayday battery, a GPS, a data communication module ASSY, a telephone microphone ASSY, and a telephone antenna ASSY. The information transmitted from the vehicle to the facilities outside of the vehicle by the radio communication via the notification unit includes, for example, the information showing the position of the vehicle (for example, a latitude, a longitude, the name of a place, a road name, and a road shape), the information as to the vehicle for specifying the vehicle (for example, a maker name, the model name of the vehicle, the registration number, the vehicle-mounted machine ID, the vehicle ID, and the engine chassis number at the time of manufacture).

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the disclosure will be described below in detail with reference to the accompanying drawings. Moreover, the actions of any flow diagram need not be implemented in the order shown; nor do all the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Technical advantages of the present disclosure:
1. The conventional mechanism is not effective in providing consistency in contact making, therefore, the throttle control and safety switch device 100 has sealed and snap type contacts that are more efficient.
2. The safety switch 103a of the throttle control and safety switch device 100 is designed in such a way that there will be no chances of fluctuation or sparking, if cable adjustment is done, since the plunger portion 104a is kept close enough to the safety switch 103a thereby preventing fluctuation or vibration.
3. The wire supplying power to the safety switch 103a is routed in a way to avoid wire abnormal bending/wire inter crossing/chances of coming in between mechanical interface, during actuation of the operating lever 101.
4. To prevent excessive force being applied on the safety switch 103a, dead stoppers are provided in the dowel and slot arrangement 106 to ensure optimum stroke for switching.
5. The throttle control and safety switch device 100 is housed in a case 107 and covered by the bottom cover 108 and sealed by upper seal 107b and a lower seal 107a to prevent entry of dust or moisture into the throttle control and safety switch device 100.
6. The safety switch 103a circuit contact is independent of compression force exerted by the compression spring 109. Hence, in case there will be minor clearance formed between the first carrier 103 and the second carrier 104 due to any reason, the circuit will still function as required.

7. The provision of the compression spring 109 and the provision of the dowel and slot arrangement 106 ensure contact is made and broken between the plunger portion 104a and the safety switch 103a.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A throttle control and safety switch device comprising:
   an operating lever connected to a pivot shaft for pivotal movement about an axis (A-A');
   a first carrier connected to the pivot shaft and pivotal about the axis (A-A') in accordance with pivotal motion of the operating lever, the first carrier comprising:
      a safety switch configured to generate and transmit a cutoff signal to an electronic control unit (ECU) upon pressing by a plunger portion; and
      a cable attachment portion adapted to engage a throttle actuating cable; and
   a second carrier pivotally connected to the pivot shaft by a fastener and connected to the first carrier by a dowel and slot arrangement, the second carrier comprises the plunger portion configured at a lower end of the second carrier,
   wherein, in a non-operational state of the throttle actuating cable, the first carrier is adapted to move towards the second carrier and the plunger portion of the second carrier presses the safety switch.

2. The throttle control and safety switch device of claim 1, wherein, in the non-operational state of the throttle actuating cable, a biasing force exerted by an elastic member moves the first carrier towards the second carrier.

3. The throttle control and safety switch device of claim 2, wherein the elastic member is a compression spring.

4. The throttle control and safety switch device of claim 3, wherein the compression spring is disposed in a space between the first carrier and the second carrier.

5. The throttle control and safety switch device of claim 1, wherein, in an operational state of the throttle actuating cable, the throttle actuating cable is adapted to exert a tension force to pull the first carrier away from the second carrier.

6. The throttle control and safety switch device according to claim 5, wherein, in the operational state of the throttle actuating cable, the operating lever is adapted to move from a zero-throttle position to a full throttle position.

7. The throttle control and safety switch device of claim 6, wherein,
   in the zero-throttle position, the operating lever is operably coupled with the first carrier such that the first carrier engages with a first dead stopper of a case enclosing the first carrier,
   and wherein in the full throttle position, the operating lever is operably coupled with the first carrier such that the first carrier engages with a second dead stopper of the case.

8. The throttle control and safety switch device of claim 7, further comprising the case enclosing the first carrier and the second carrier, the case defining an opening for receiving at least a portion of the pivot shaft.

9. The throttle control and safety switch device of claim 8, wherein the case comprises a lower seal for sealing a clearance between an outer diameter of the pivot shaft and an inner diameter of the opening of the case and an upper seal for sealing an interface between the case and a bottom cover.

10. The throttle control and safety switch device according to claim 1, wherein the electronic control unit (ECU) is further configured to generate a notification upon receiving the cutoff signal.

11. The throttle control and safety switch device according to claim 10, wherein the notification is at least one of an audio notification, a visual notification, an audio-visual notification, and a haptic notification.

* * * * *